United States Patent [19]
Sadri

[11] Patent Number: 5,207,173
[45] Date of Patent: May 4, 1993

[54] LOW PRESSURE TIRE ALARM INDICATOR

[76] Inventor: Frederick F. Sadri, 2222 Beverly Dr., Charlotte, N.C. 28207

[21] Appl. No.: 967,180

[22] Filed: Oct. 27, 1992

[51] Int. Cl.⁵ .............................................. B60C 23/06
[52] U.S. Cl. .................................. 116/34 B; 116/67 R; 116/34 R
[58] Field of Search ................... 116/34 B, 34 R, 67 R

[56] References Cited

U.S. PATENT DOCUMENTS

| | | | |
|---|---|---|---|
| 3,154,048 | 10/1964 | Neu | 116/34 R |
| 4,235,184 | 11/1980 | Schiavone | 116/34 R |
| 4,353,322 | 10/1982 | Weglin et al. | 116/34 B |
| 4,476,455 | 10/1984 | Kawakami | 116/34 R X |

*Primary Examiner*—Daniel M. Yasich
*Attorney, Agent, or Firm*—W. Thad Adams, III

[57] ABSTRACT

A low pressure tire indicator is a mechanical device for producing an audible warning to the driver of low or inadequate tire pressure. The low pressure tire indicator includes a strap for mounting the low pressure tire indicator to a wheel hub. A spring housing is mounted on the strap. A rocker arm is mounted on an anchor pin positioned within the spring housing, and extends away from the wheel hub towards the inside tread wall of a pneumatic tire mounted on the wheel hub. The rocker arm includes a roller on a free end for engaging the inside tread wall of the tire during a low pressure condition. A hammer is mounted on the anchor pin and moves in unison with the rocker arm. A spring is mounted on the anchor pin, and, during proper tire inflation, normally urges the hammer into contact with the wheel hub, and normally positions the roller on the free end of the rocker arm between the wheel hub and the inside tread wall of the tire.

9 Claims, 3 Drawing Sheets

LOW PRESSURE TIRE ALARM INDICATOR

TECHNICAL FIELD AND BACKGROUND OF THE INVENTION

This invention relates to a mechanical low pressure tire indicator which produces an audible warning when pressure in a tubeless pneumatic tire is low. The problem of low or inadequate tire pressure, and the detection of this problem, is manifest. Several concerns, such as poor fuel economy, increased tire wear, and impaired handling of the motor vehicle are all direct results of inadequate tire pressure. The present invention improves upon the prior art by providing a reliable, simple, and inexpensive means of indicating low tire pressure.

The present invention confronts the problem of low pressure detection by utilizing a spring device and hammer designed to strike the inner surface of a wheel hub when activated, thus producing an audible warning of low tire pressure. The invention has three main components; a spring device, a replaceable and adjustable rocker arm with an end roller on one end and a hammer on the other end. The installation and production costs are likely to be far less expensive than similar devices, particularly those that are electrical.

The invention disclosed in the prior art, for example, U.S. Pat. No. 4,476,455 (Kawakami), includes a shielding case mounted on the rim of a wheel and a rocking rod. The rocking rod has a first end contained within the shielding case and a second end extending into the tire and ending at a spaced distance from the inner surface of the tire tread. When tire pressure is low, the first end strikes the shielding case upon each wheel revolution, producing an audible warning of low tire pressure. The disadvantage of this device is in the durability and replaceability of the rocking rod. A tire in a condition of extreme low pressure would inevitably damage, if not destroy, the rocking rod and/or case shield, requiring replacement of the entire device.

The warning device disclosed in U.S. Pat. No. 4,353,322 (Weglin) is similarly deficient. Although the device fits within the wheel hub in such a way as to prevent damage when there is low or no tire pressure, the device contains a much more intricate assembly than that of the present invention. The Welgin device has many component parts, thereby increasing the risk of premature failure due to failure of an essential component. Replacement of an internal part would certainly be impractical.

SUMMARY OF THE INVENTION

Therefore it is an object of the invention to provide a low pressure tire indicator which emits an audible warning when pressure in a tubeless pneumatic tire is inadequate.

It is another object of the invention to provide a simple mechanical device for the detection and warning of low pressure within a tubeless pneumatic tire.

It is another object of the invention to provide a low pressure tire indicator that does not interfere with the normal operation of the tubeless pneumatic tire.

It is another object of the invention to provide a low pressure tire indicator that does not require a visual inspection of the indicator in order to determine the existence of inadequate tire pressure.

It is another object of the invention to provide a low pressure tire indicator which, upon each revolution of the low pressure tire, immediately alerts the driver of the existence of low or inadequate tire pressure.

It is another object of the invention to provide a low pressure tire indicator that is essentially maintenance-free, but if such maintenance is required, it is an object of the invention to provide for easy repair or replacement.

It is another object of the invention to provide a low pressure tire indicator that utilizes an inexpensive mechanical means, which takes advantage of natural principles of sound transmission through solid substance, as opposed to a more expensive and complex electrical means.

It is another object of the invention to provide a low pressure tire indicator that does not damage the tire when the tire is in a low or no tire pressure condition.

These and other objects of the present invention are achieved in the preferred embodiments disclosed below by providing low pressure tire indicator mounted to a wheel hub by a heavy duty strap. A spring housing is carried by the strap. An anchor pin, including first and second end closures, passes through the spring housing. A rocker arm, mounted on the spring housing and carried by the anchor pin, extends away from the wheel hub towards the inside tread wall of a pneumatic tire mounted on the wheel hub. The rocker arm includes a skid or preferably a roller on a free end for engaging the inside tread wall of the tire during a low pressure condition. A hammer, mounted on the spring housing and carried by the anchor pin, is integrally formed with and moves in unison with the rocker arm. A spring is mounted within the spring housing and carried by the anchor pin. During proper tire inflation, the spring normally urges the hammer into contact with the wheel hub, and positions the roller on the free end of the rocker arm at a precise distance between the wheel hub and the inside tread wall of the tire. When a predetermined low pressure within the tire is reached, momentary and abrupt engagement between the roller and the inside tread wall of the tire results. This engagement occurs once during each revolution of the tire as the portion of the tire adjacent the low pressure tire indicator engages a road surface. An abrupt disengagement of the roller from the inside tread wall is thereby translated as an equally abrupt impact between the hammer and the wheel hub as the rocker arm and the hammer return to their normal positions. This produces an audible, repetitive warning of low tire pressure.

According to one preferred embodiment of the invention, the spring includes a coil spring mounted within the spring housing and carried by the anchor pin. First and second spring extensions are integrally formed with the coil spring and extend in opposite directions from the coil spring. The first extension engage the wheel hub and the second extension engages the hammer in a tensioned condition.

According to another preferred embodiment of the invention, the spring housing has first and second side ends folded upward and formed at a spaced-apart distance. This distance generally corresponds to the width of the strap. The first and second side ends extend perpendicular from the wheel hub a sufficient distance to accommodate the diameter of the anchor pin and coil spring.

According to yet another preferred embodiment of the invention, the rocker arm includes first and second elongate spaced-apart rocker arm members having a distal end defining an integrally formed roller journal.

According to yet another preferred embodiment of the invention, the roller includes a through-bore for rotatably mounting the roller on the roller journal.

According to yet another preferred embodiment of the invention, the rocker arm is positioned to engage the inside tread wall once during each revolution of the tire during a low tire-pressure condition at an approximate 45 degree angle with respect to the inside tread wall.

According to yet another preferred embodiment of the invention, the rocker arm is positioned in spaced-apart relation to the inside tread wall during a normal tire-pressure condition at an approximate 70 degree angle with respect to the inside tread wall.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
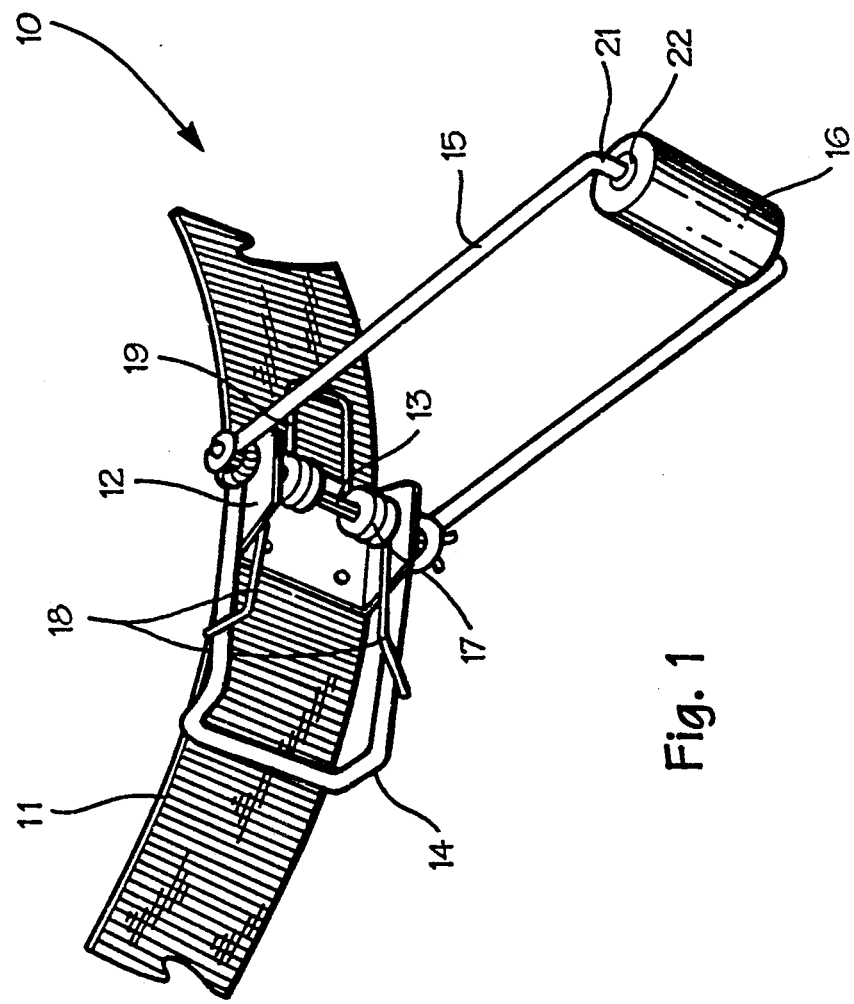
FIG. 1 is a perspective view of the invention.

Referring now specifically to the drawings, a low pressure tire indicator for warning a driver of low or inadequate tire pressure is illustrated in FIG. 1, and referenced generally at broad reference numeral 10. The tire indicator 10 includes a strap 11 for securely attaching the tire indicator 10 to a wheel hub 30 (see FIGS. 2 and 3). The strap 11 is designed for permanent attachment to the wheel hub 30. Preferably, the strap 11 comprises a steel band clamped to the wheel hub 30, and may include a counterweight (not shown).

A spring housing 12 is securely attached to the strap 11. An anchor pin 13 passes through the spring housing 12, and mounts an integrally-formed hammer 14 and a rocker arm 15. A roller 16 is positioned on the free end of the rocker arm 15. A coil spring 17 is carried by the anchor pin 13, and is mounted within the spring housing 12. The coil spring 17 includes spring extensions 18 and 19.

The hammer 14 extends along the periphery of the wheel hub 30 and normally engages the strap 11 when the tire indicator 10 is in a normal position, as when tire pressure is normal. According to one embodiment, the hammer 14 is approximately 5 cm long, with the hammer head 1 cm long.

The rocker arm 15 is typically 10 cm in length, thus activating the tire indicator 10 when pressure in a standard automobile tire 32 drops below approximately 20 psi. According to another embodiment of the invention, the rocker arm 15 is separately attached to the hammer 14 and the spring housing 12. The rocker arm 15 of this embodiment can be easily replaced with a snap-in rocker arm 15 replacement, or easily adjusted to accommodate various types of tubeless tires 32.

A roller journal 21 is integrally formed on the free end of the rocker arm 15, and carries a roller 16 having a center through-bore 22. The through-bore 22 is of slightly greater diameter than the roller journal 21 to allow free rotation of the roller 16 about the roller journal 21. The roller 16 can be a durable plastic or rubber, and is approximately 1.5 cm in diameter with the through-bore 22 approximately 0.5 cm in diameter.

Figure 2:
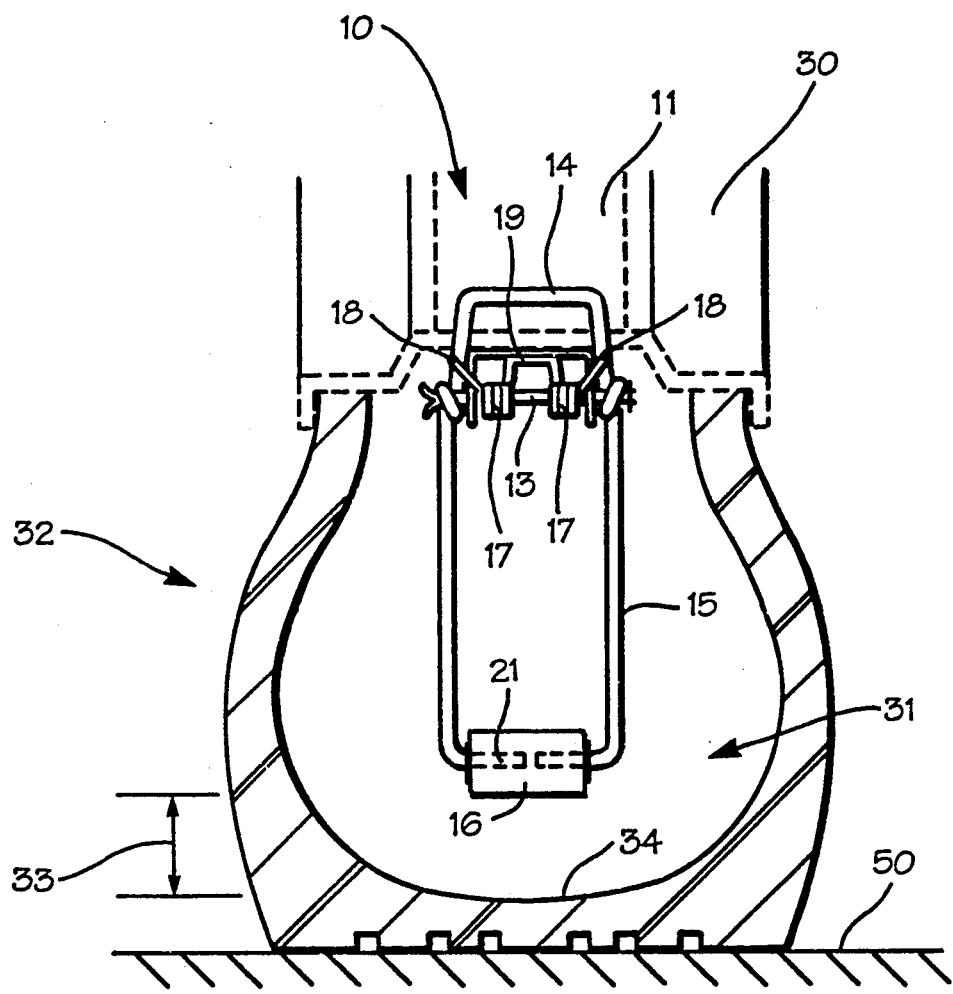
FIG. 2 is a front elevation of the invention shown attached to the wheel hub of an adequately inflated pneumatic tire, in cross-section.

Referring now to FIG. 2, the tire indicator 10 as attached to a wheel hub 30 is shown. As is apparent, the pneumatic tire 32 is adequately inflated, thereby illustrating the tire indicator 10 in an inactive position. A biasing force is supplied by the coil spring 17 and spring extensions 18 and 19. Spring extensions 18 and 19 engage the hammer 14 and strap 11, respectively, in a tensioned condition. Thus, the hammer 14 is urged firmly against the wheel hub 30 by extension 18 of the coil spring 17, and the rocker arm 15 extends into the open space 31 of the pneumatic tire 32. In this position, the roller 16 is positioned at a predetermined distance 33 from the inside tread wall 34 of the tire 32.

Figure 3:
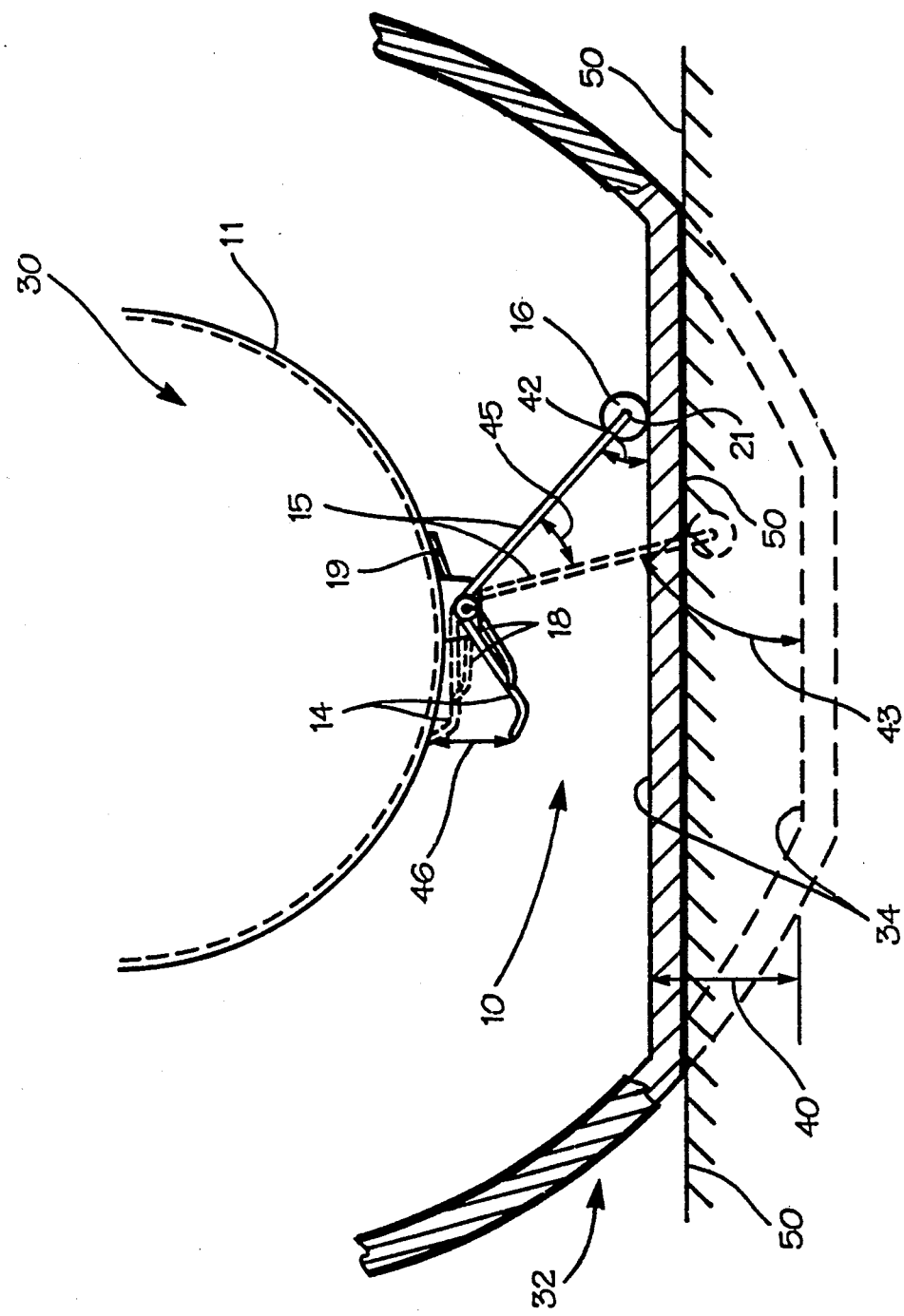
FIG. 3 is a side elevation of the invention attached to a wheel hub, showing the device in operative engagement with the inside tread wall of a deflated tire in cross-section.

FIG. 3 illustrates the tire indicator 10 in an operative position within a low pressure tire 32. The tire indicator 10, shown in phantom, illustrates the condition of the tire 32 when tire pressure is adequate, this position being a side elevation of FIG. 2. The phantom sketch shows the rocker arm 15 at an approximate seventy degree angle 43 with respect to the inside tread wall 34 of the fully inflated tire 32.

The degree of tire compression due to under-inflation is shown at reference numeral 40. When tire pressure is low, the tire indicator 10 is activated at the instant the roller 16 of the tire indicator 10 is directly adjacent that portion of the tire 32 engaging the road surface 50, this point being referred to generally as the activation point.

According to one embodiment of the tire indicator 10, activation occurs once per tire 32 revolution. At a predetermined low pressure within the tire 32, momentary engagement between the roller 16 and the inside tread wall 34 of the tire 32 occurs, the roller 16 revolving about the roller journal 21 as it engages the inside tread wall 34. At this instant, the rocker arm 15 is forced inwardly toward the wheel hub 30, while the integrally formed hammer 14 is simultaneously forced a distance 46 outward, away from the wheel hub 30. An approximate forty-five degree angle 42 is formed by the rocker arm 15 and the inside tread wall 34 upon engagement. As shown at reference numeral 45, the rocker arm 15 is pivoted approximately thirty degrees, and the hammer 14 is raised a distance shown at 46.

Upon further revolution of the tire, the tire indicator 10 revolves away from the activation point. This causes an abrupt disengagement of the roller 16 from the inside tread wall 34, and an abrupt impact between the hammer 14 and the wheel hub 30 as the rocker arm 15 and the hammer 14 return to their normal positions, as illustrated in phantom. This effect produces an audible warning of low tire pressure, once per tire revolution, until adequate tire pressure has been restored.

Preferably, the strap 11 mounting the tire indicator 10 to the wheel hub 30 is a heavy duty version of the steel band hardware strap commonly called a worm drive clamp. The strap 11 includes a bolt housing and threaded bolt which, when tightened with a screwdriver, would advance the strap 11 through the bolt housing. This effect increasingly tightens the strap 11 to the wheel hub 30.

As shown in FIGS. 1 and 2, the anchor pin 13 is a heavy duty cotter pin, which can be easily removed from the spring housing 12 to disengage the hammer 14 and rocker arm 15 from the tire indicator 10. This allows the hammer 14 and rocker arm 15 to be readily repaired or replaced. According to another embodiment (not shown), the anchor pin 13 is a slender, steel pin with a washer head on one end and a small through-bore on the other. A short cotter pin is inserted through the through-bore to prevent lateral movement of the anchor pin 13 within the spring housing 12.

When removing the tire 32, care must be taken not to damage the tire indicator 10. However, if the tire indicator 10 is damaged, the provisions for easy replacement of the rocker arm 15 and/or the integrally formed rocker arm 15 and hammer 14, as previously discussed, allow the tire indicator 10 to be readily and completely repaired.

A low pressure tire indicator for producing an audible warning, alerting the driver of low or inadequate pressure within a pneumatic tire has been disclosed. Various details of the invention may be changed without departing from its scope. Further more, the foregoing description of the preferred embodiment of the invention and the best mode for practicing the invention are provided for the purpose of illustration only and not for the purpose of limitation—the invention being defined by the claims.

I claim:

1. A low pressure tire indicator comprising:
   (a) a mounting means for being mounted on a wheel hub;
   (b) a rocker arm mounted on the mounting means and extending away from said wheel hub towards the inside tread wall of a pneumatic tire mounted on said wheel hub, said rocker arm including a roller on a free end for engaging the inside tread wall of the tire during a low pressure condition;
   (c) a hammer mounted on the mounting means and moving in unison with said rocker arm; and
   (d) a biasing means mounted on the mounting means in cooperation with said rocker arm and said hammer and, during proper tire inflation, normally urging said hammer into contact with said wheel hub, and positioning the roller on the free end of said rocker arm between said wheel hub and the inside tread wall of the tire;
   (e) whereby a predetermined low pressure within the tire causes momentary engagement between the roller and the inside tread wall of the tire once during each revolution of the tire as the portion of the tire adjacent the low pressure tire indicator engages a road surface, followed by abrupt disengagement of the roller from the inside tread wall and an abrupt impact between the hammer and the wheel hub as the rocker arm and the hammer return to their normal positions, producing an audible warning of low tire pressure.

2. A low pressure tire indicator comprising:
   (a) a strap means for being secured around the periphery of a wheel hub;
   (b) a spring housing carried by said strap means;
   (c) an anchor pin including first and second end closures passing through said spring housing;
   (d) a rocker arm mounted on said spring housing and carried by said anchor pin, extending away from said wheel hub towards the inside tread wall of a pneumatic tire mounted on said wheel hub, said rocker arm including a roller on a free end for engaging the inside tread wall of the tire during a low pressure condition;
   (e) a hammer mounted on said spring housing and carried by said anchor pin, integrally formed with and moving in unison with the rocker arm;
   (f) a biasing means mounted on said spring housing and carried by said anchor pin, and, during proper tire inflation, normally urging said hammer into contact with said wheel hub, and positioning the roller on the free end of said rocker arm between said wheel hub and the inside tread wall of the tire; and
   (g) whereby a predetermined low pressure within the tire causes momentary engagement between the roller and the inside tread wall of the tire once during each revolution of the tire as the portion of the tire adjacent the low pressure tire indicator engages a road surface, followed by abrupt disengagement of the roller from the inside tread wall and an abrupt impact between the hammer and the wheel hub as the rocker arm and the hammer return to their normal positions, producing an audible warning of low tire pressure.

3. A low pressure tire indicator as claimed in claim 2, wherein said biasing means comprises a spring means.

4. A low pressure tire indicator as claimed in claim 3, wherein said spring means comprises a coil spring mounted within said spring housing and carried by said anchor pin, and first and second spring extensions integrally formed with said coil spring and extending in opposite directions from said coil spring, the first extension engaging the wheel hub and the second extension engaging the hammer in a tensioned condition.

5. A low pressure tire indicator as claimed in claim 2, wherein said spring housing comprises first and second side ends folded upward and formed at a spaced-apart distance generally corresponding to the width of said strap means, said first and second side ends extending perpendicular from the wheel hub a sufficient distance to accommodate the diameter of said anchor pin and said coil spring.

6. A low pressure tire indicator as claimed in claim 2, wherein said roller includes a through-bore rotatably mounting said roller on an integrally formed roller journal.

7. A low pressure tire indicator as claimed in claim 2, wherein said rocker arm comprises first and second elongate spaced-apart rocker arm members joined on respective distal ends by an integrally formed roller journal.

8. A low pressure tire indicator as claimed in claim 7, wherein said rocker arm is positioned to engage the inside tread wall during a low pressure condition at an approximate 45 degree angle with respect to the inside tread wall.

9. A low pressure tire indicator as claimed in claim 7, wherein said rocker arm is positioned in spaced-apart relation to the inside tread wall during a normal pressure condition at an approximate 70 degree angle with respect to the inside tread wall.

* * * * *